Jan. 9, 1951  H. JOHNSON  2,537,589
DELAY CIRCUIT FOR RECTANGULAR WAVES
Filed Dec. 15, 1945
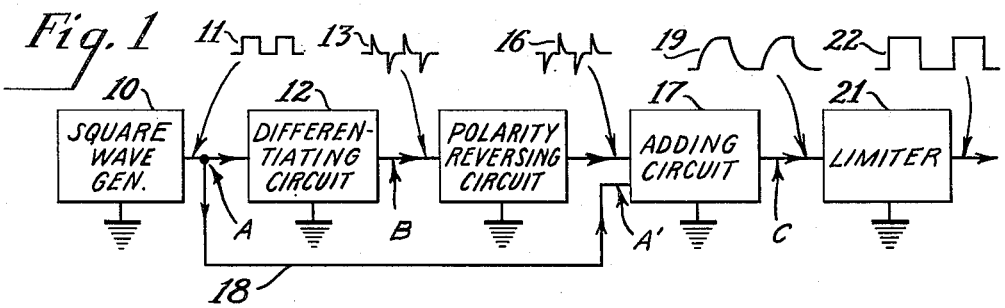
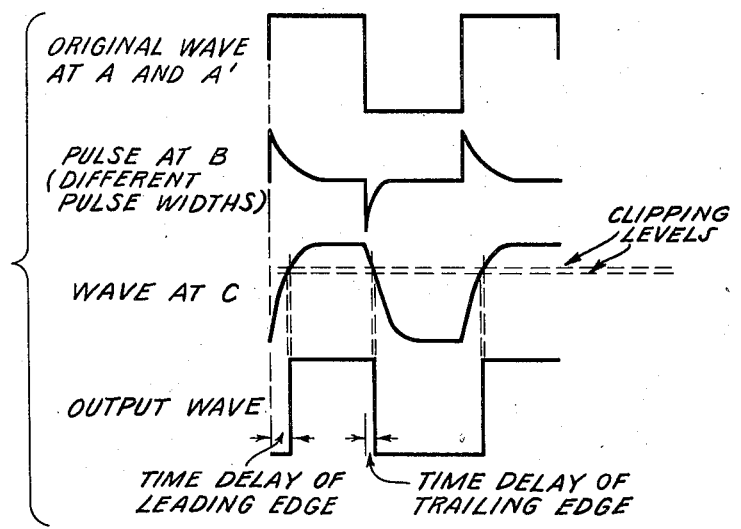
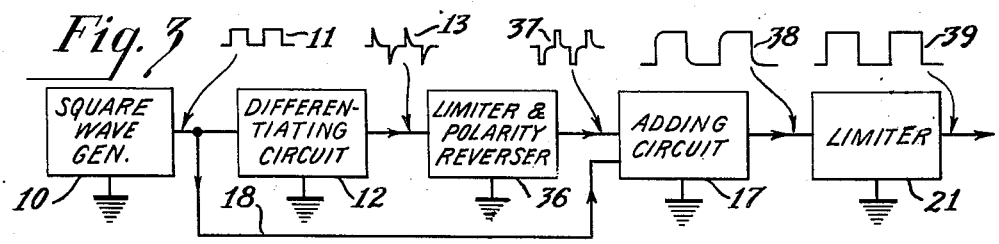
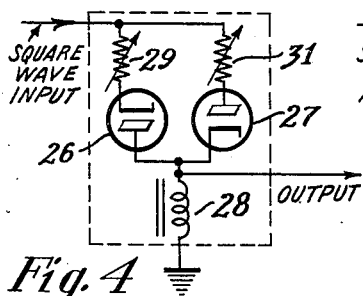
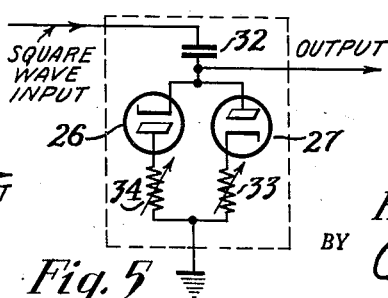
INVENTOR.
Harwick Johnson
BY
ATTORNEY Patented Jan. 9, 1951

2,537,589

UNITED STATES PATENT OFFICE 2,537,589

DELAY CIRCUIT FOR RECTANGULAR WAVES

Harwick Johnson, Princeton, N. J., assignor to Radio Corporation of America, a corporation of Delaware Application December 15, 1945, Serial No. 635,376

2 Claims. (Cl. 178—44)

My invention relates to wave shaping and time delay circuits and particularly to apparatus for obtaining the desired timing of rectangular waves.

An object of the invention is to provide an improved method of and means for obtaining a delayed rectangular wave.

Another object of the invention is to provide an improved method of and means for delaying a rectangular wave and adjusting its symmetry.

Another object of the invention is to provide a simplified circuit for delaying and shaping a rectangular wave.

Still another object of the invention is to provide an improved differentiating circuit.

In practicing one embodiment of the invention the rectangular wave is passed through a differentiating circuit that is designed to produce positive and negative pulses that preferably are separately adjustable in width or shape. The resulting differentiated wave is reversed in polarity and combined with the rectangular wave. The combined wave is then clipped to obtain the desired rectangular wave having delayed front and back edges.

The invention will be better understood from the following description taken in connection with the accompanying drawing in which Figure 1 is a block diagram of one embodiment of the invention, Figure 2 is a group of graphs that are referred to in explaining the invention, Figure 3 is a block diagram of another embodiment of the invention, and Figures 4 and 5 are circuit diagrams of differentiating circuits designated in accordance with one feature of the present invention.

In the several figures, similar parts are indicated by similar reference characters.

Referring to Fig. 1, a square wave or rectangular wave generator 10 supplies a wave 11 to a differentiating circuit 12 whereby a differentiated wave 13 is produced. The wave 13 is reversed in polarity by a polarity reversing circuit 14 to produce the wave 16 which is supplied to an adding circuit 17.

The rectangular wave 11 is also supplied over a conductor 18 to the adding circuit 17 so that a wave of the shape shown at 19 is obtained which is the sum of waves 11 and 16. The wave 19 is then passed through a clipper or limiter circuit 21 to obtain a rectangular wave 22 having delayed front and leading edges.

The time relation of the various wave forms is apparent from an inspection of Fig. 2 although the graphs of Fig. 2 are for an embodiment wherein the positive and negative differentiated pulses are of different durations. Such pulses of different durations may be obtained by employing a differentiating circuit such as shown in Fig. 4 or Fig. 5. The graphs shown in Fig. 1 are for the case where the positive and negative pulses of wave 13 are of equal duration, in which case the differentiating circuit may be conventional.

Referring to Fig. 4, the differentiating circuit comprises a pair of diodes 26 and 27 connected to pass current in opposite directions, and each connected in series with an inductance coil 28. Variable resistors 29 and 31 are connected in series with the diodes 26 and 27, respectively.

The positive half cycle of the applied rectangular wave is passed by the diode 27 and the duration and shape of the resulting positive pulse appearing across the coil 28 may be changed by adjusting the value of the resistor 31. Similarly, the duration and shape of the negative pulse may be changed by adjusting the value of the resistor 29. The graphs in Fig. 2 show how both the timing and the symmetry of a rectangular wave may be adjusted by employing the differentiating network of Fig. 4 in the circuit shown in Fig. 1, the circuit of Fig. 4 being represented in this case by the block 12.

Fig. 5 shows another differentiating circuit that may be employed the same as that of Fig. 4. A small capacitor 32 is connected in series with the diodes 26 and 27, and the positive and negative differentiated pulses are adjusted by resistors 33 and 34, respectively.

Fig. 3 shows an embodiment of the invention wherein the differentiated wave 13 is reversed in polarity and clipped by a polarity reverser and clipper circuit 36 to produce the positive and negative pulses of wave 37.

The wave 37 and the wave 11 are added in the circuit 17 to produce the substantially rectangular wave 38 which is squared up by the limiter 21 to obtain a good rectangular wave 39 which does not have rounded corners.

The timing of the front and back edges of the rectangular wave 39 is determined by the widths of the negative and positive pulses, respectively, of the wave 37. The widths of these pulses are determined by the differentiating circuit adjustment and by the clipping levels in the limiter 36. The differentiating circuit 12 may be one of the circuits shown in Figs. 4 and 5 where it is desired to make the widths of the positive and negative pulses of the wave 37 independently adjustable.

I claim as my invention:

1. A circuit for delaying both the front and back edges of a substantially rectangular wave, said circuit comprising differentiating means arranged to provide a differentiated wave consisting of positive and negative pulses each of which has a trailing edge and each of which is adjustable in width with respect to the other, means for adding said differentiated wave and said rectangular wave in polarity opposition to obtain a combined wave which has the wave shape of a rectangular wave with sloping front and back edges, and means for clipping said combined wave at two different voltage levels to obtain a rectangular wave having delayed leading and trailing edges.

2. The invention according to claim 1 wherein said differentiating means comprises a pair of rectifiers connected in shunt and also connected in opposite current-conducting directions with respect to the applied signal, a pair of variable resistors connected in series with said rectifiers, respectively, a reactance element of comparatively high impedance connected in series with said rectifiers and resistors, means whereby input signal may be applied across said series combination of resistors, rectifiers, and high impedance unit, and means whereby the resulting differentiated signal may be taken off said circuit.

HARWICK JOHNSON.

REFERENCES CITED

The following references are of record in the file of this patent:

UNITED STATES PATENTS

| Number | Name | Date |
|---|---|---|
| 2,200,009 | Nuttall | May 7, 1940 |
| 2,251,973 | Beale et al. | Aug. 12, 1941 |
| 2,412,227 | Och et al. | Dec. 10, 1946 |
| 2,419,546 | Greig | Apr. 29, 1947 |
| 2,421,138 | Wheeler | May 27, 1947 |